(12) United States Patent
Kawata et al.

(10) Patent No.: US 9,829,746 B2
(45) Date of Patent: Nov. 28, 2017

(54) DISPLAY APPARATUS HAVING OPTICAL SHEET

(71) Applicant: CANON KABUSHIKI KAISHA, Tokyo (JP)

(72) Inventors: Jun Kawata, Fujisawa (JP); Atsushi Morita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 144 days.

(21) Appl. No.: 14/942,014

(22) Filed: Nov. 16, 2015

(65) Prior Publication Data

US 2016/0139464 A1 May 19, 2016

(30) Foreign Application Priority Data

Nov. 19, 2014 (JP) ................................ 2014-234529
Oct. 30, 2015 (JP) ................................ 2015-214684

(51) Int. Cl.
*G02F 1/1335* (2006.01)

(52) U.S. Cl.
CPC .. *G02F 1/133608* (2013.01); *G02F 1/133603* (2013.01); *G02F 1/133606* (2013.01)

(58) Field of Classification Search
CPC .......... G02F 1/133608; G02F 2201/54; G02F 1/133606; G02F 1/133603; G02B 6/0088
See application file for complete search history.

(56) References Cited

U.S. PATENT DOCUMENTS

| 7,118,265 | B2 * | 10/2006 | Cho ................... | G02F 1/133308 349/58 |
| 7,184,110 | B2 * | 2/2007 | Kim .................. | G02F 1/133608 349/58 |
| 7,517,134 | B2 * | 4/2009 | Hu .................... | G02F 1/133608 362/362 |
| 7,982,815 | B2 * | 7/2011 | Hisada .............. | G02F 1/133608 349/58 |
| 8,625,049 | B2 * | 1/2014 | Kim .................. | G02F 1/133608 349/58 |
| 2009/0079896 | A1 | 3/2009 | Hayashi et al. | |
| 2014/0085360 | A1 | 3/2014 | Ohno et al. | |

FOREIGN PATENT DOCUMENTS

JP 2002-250915 A 9/2002
JP 2005-242270 A 9/2005

* cited by examiner

*Primary Examiner* — Robert May
(74) *Attorney, Agent, or Firm* — Fitzpatrick, Cella, Harper & Scinto

(57) ABSTRACT

Disclosed is a display apparatus including: a display panel; a light source unit; an optical sheet arranged between the display panel and the light source unit; and a housing configured to accommodate the display panel, the light source unit, and the optical sheet, wherein one side in a vertical direction and one side in a horizontal direction among four sides of the optical sheet are support sides held by inside walls of the housing, gaps are provided between the other sides and the inside walls of the housing, the optical sheet has a hole portion near the support sides, and the housing has a positioning portion that engages with the hole portion and restricts movement of the optical sheet in directions perpendicular to the inside walls while allowing deformation of the optical sheet in directions parallel to the support sides.

20 Claims, 10 Drawing Sheets

DISPLAY APPARATUS HAVING OPTICAL SHEET

BACKGROUND OF THE INVENTION

Field of the Invention

The present invention relates to a holding structure for optical sheets used in a display apparatus.

Description of the Related Art

In recent years, liquid crystal display (LCD) modules using an LCD panel and light emitting diodes (LEDs) serving as the light sources of a backlight have become mainstream as display modules used in image display apparatuses. A backlight has a direct structure in which light sources are arranged on the back surface of an LCD panel or an edge light structure in which a light guiding plate and light sources on the lateral side of the light guiding plate are arranged on the back surface of an LCD panel. In any of the backlight structures, a plurality of optical sheets for diffusion and condensing is stacked one on top of another between an LCD panel and LEDs and a light guiding plate to improve image quality characteristics such as brightness and uniformity.

Hereinafter, a description will be given of the structure of a display module and the holding structure of optical sheets in the related art.

An LCD panel is held with its periphery on the outside of a display region sandwiched between a panel case and a panel holder. An LED substrate is accommodated in a box-shaped backlight case having an opening on its panel side. The optical sheets are held with their peripheries on the outside of an illumination region for the LCD panel sandwiched between the panel holder and the backlight case on their front and back surface sides. In addition, the optical sheets are held with their outside shapes creating gaps between the outside shapes and the inside walls of the panel holder so as to be prevented from being in contact with the housing and wrinkling at thermal expansion.

In this structure, there is a likelihood that the sheets rub against each other due to vibration at transportation and get damaged to cause abnormal display. In view of this problem, the related art has proposed a structure shown in FIG. 10. In this structure, optical sheets 110 have positioning shapes including locking holes 110a and slits 110b continuing to the locking holes 110a, and the positioning shapes engage with pins 120 provided on a backlight case (see Japanese Patent Application Laid-open No. 2005-242270).

SUMMARY OF THE INVENTION

In the structure of Japanese Patent Application Laid-open No. 2005-242270, the positioning shapes including the locking holes 110a and the slits 110b deform even if the optical sheets thermally deform and the locking holes 110a deviate in position from the pins 120, whereby the occurrence of rattling and the rubbing of the sheets due to vibration are prevented.

However, in the optical sheets of Japanese Patent Application Laid-open No. 2005-242270, the positioning shapes deform with the application of a force. Therefore, there is a likelihood that rattling occurs in the engagement between the positioning shapes and the pins due to repeated deformation and that wrinkling occurs due to the deformation of the positioning shapes and the deformation also affects an effective illuminated region to cause display irregularities.

Therefore, the present invention prevents the rubbing of optical sheets due to vibration and the occurrence of rattling or wrinkling in optical sheets even if the optical sheets thermally deform in a display apparatus having the optical sheets.

According to a first aspect of the present invention, there is provided a display apparatus including:

a display panel;

a light source unit configured to illuminate the display panel from a back surface side thereof;

an optical sheet arranged between the display panel and the light source unit; and a housing configured to accommodate the display panel, the light source unit, and the optical sheet, wherein one side in a vertical direction and one side in a horizontal direction among four sides of the optical sheet are support sides held by inside walls of the housing, gaps are provided between the other sides among the four sides in the vertical and horizontal directions and the inside walls of the housing, the optical sheet has one or more hole portions near the support sides, and the housing has a positioning portion that engages with each of the hole portions and restricts movement of the optical sheet in directions perpendicular to the inside walls of the housing while allowing deformation of the optical sheet in directions parallel to the support sides.

According to a second aspect of the present invention, there is provided a display apparatus including:

a display panel;

a light source unit configured to illuminate the display panel from a back surface side thereof;

an optical sheet arranged between the display panel and the light source unit; and a housing configured to accommodate the display panel, the light source unit, and the optical sheet, wherein one side in a vertical direction and one side in a horizontal direction among four sides of the optical sheet are support sides held by inside walls of the housing, gaps are provided between the other sides among the four sides in the vertical and horizontal directions and the inside walls of the housing, the optical sheet has a hole portion near a point at an intersection of the support sides of the optical sheet, and the housing has a positioning portion that engages with the hole portion and restricts movement of the optical sheet in directions perpendicular to the inside walls of the housing while allowing deformation of the optical sheet in directions parallel to the support sides.

According to an embodiment of the present invention, it is possible to prevent the rubbing of optical sheets due to vibration and the occurrence of rattling or wrinkling in optical sheets even if the optical sheets thermally deform in a display apparatus having the optical sheets.

Further features of the present invention will become apparent from the following description of exemplary embodiments with reference to the attached drawings.

DESCRIPTION OF THE EMBODIMENTS

First Embodiment

Hereinafter, a description will be given of a first embodiment of the present invention with reference to the drawings.

Figure 1:
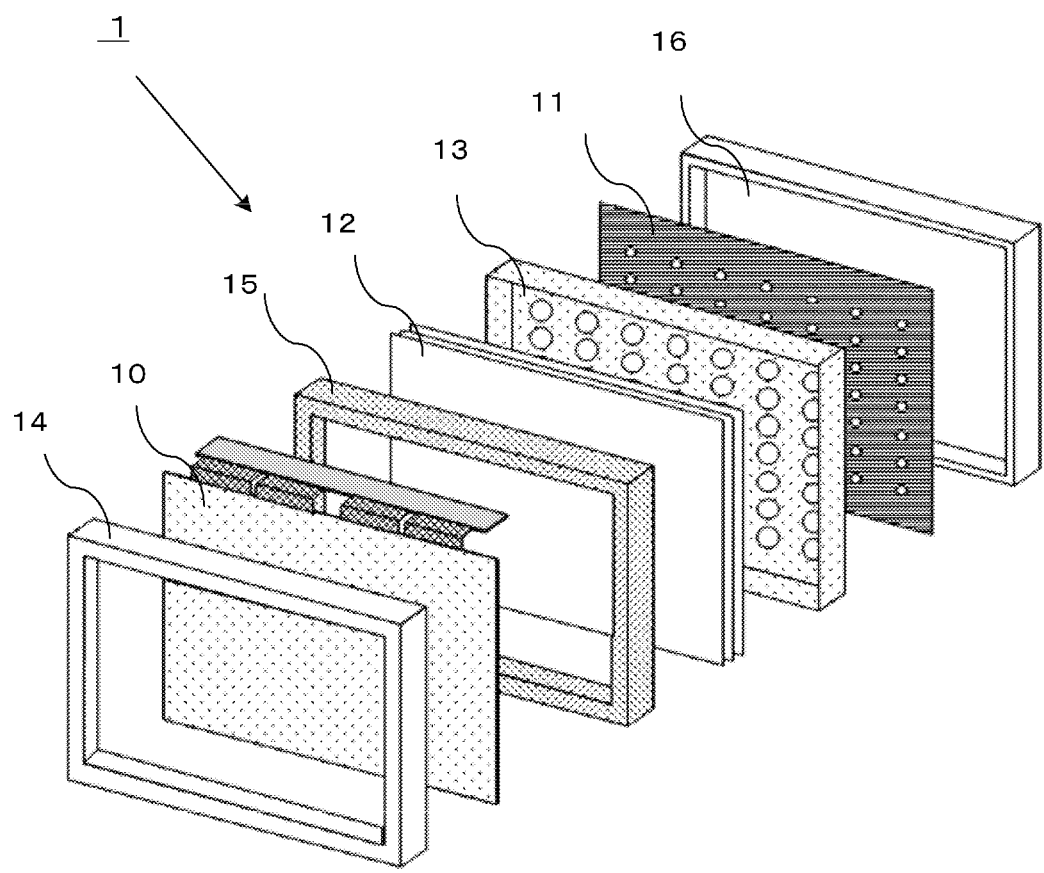
FIG. 1 is an exploded perspective view showing a display module structure according to a first embodiment.
Figure 2:
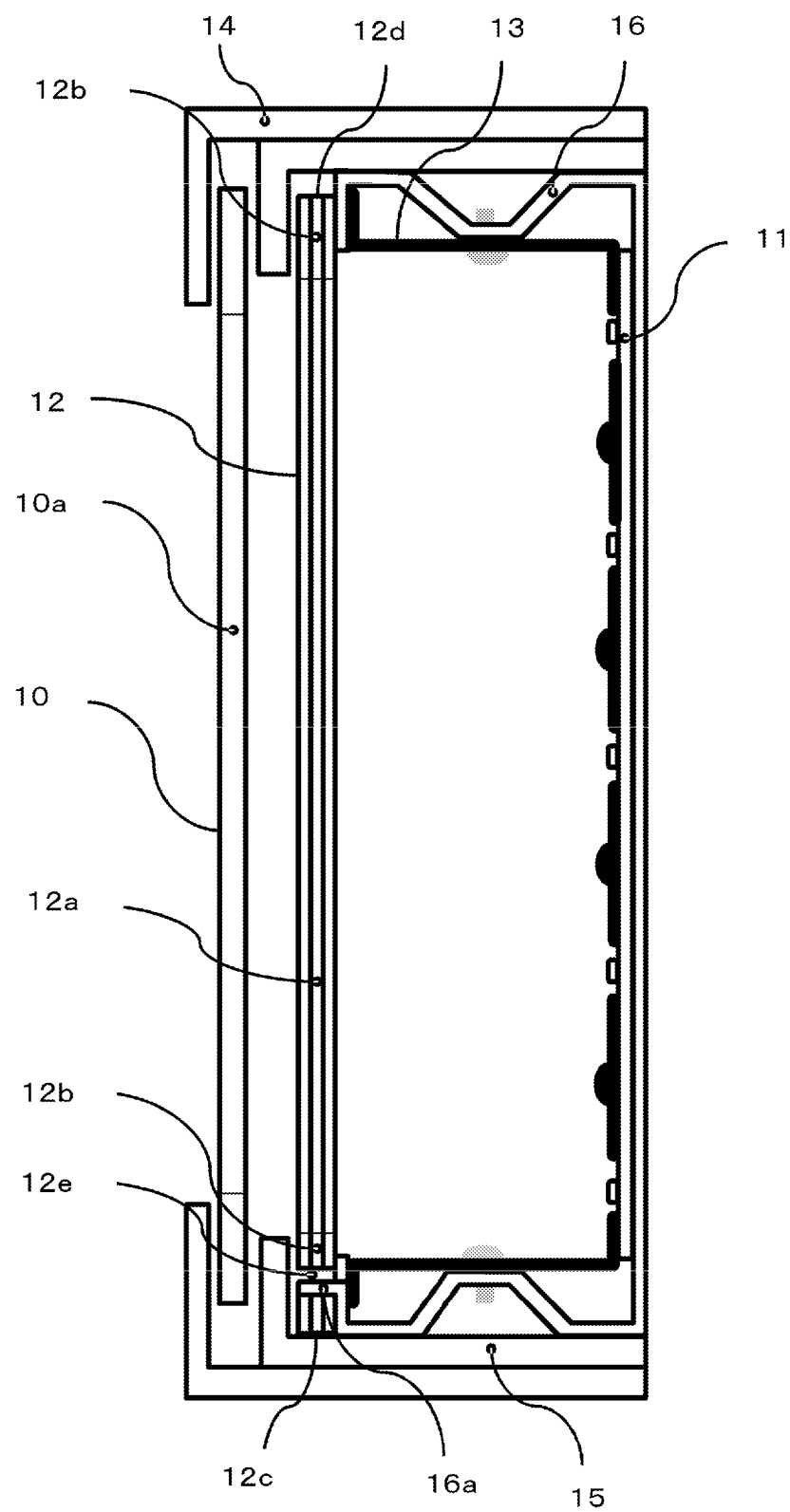
FIG. 2 is a cross-sectional view showing the display module structure according to the first embodiment.

To begin with, the structure of a display module according to the present invention will be described using FIGS. 1 and 2. FIG. 1 shows an exploded perspective view describing the outline of the display module according to the first embodiment, and FIG. 2 shows the cross section of the display module according to the first embodiment.

A display module 1 has an LCD panel 10 as a display panel and an LED substrate 11 having LEDs mounted in a matrix pattern as a light source unit to illuminate the LCD panel 10 on its back surface side. In addition, the display module 1 has a structure in which a plurality of optical sheets 12 that has the function of diffusing and condensing the light of the LEDs is arranged between the LCD panel 10 and the LED substrate 11 and a reflection sheet 13 that reflects light onto the side of the LCD panel 10 is arranged on the LED substrate 11.

Next, the holding structure of a housing that accommodates the above optical-system components will be described. On its front and back surface sides, the LCD panel 10 is held by a panel case 14 and a panel holder 15 at its periphery on the outside of an image display region 10a in which an image is displayed. The LED substrate 11 and the reflection sheet 13 are accommodated in a box-shaped backlight case 16 that has an opening on its panel side. On their front and rear surface sides, the optical sheets 12 are held by the panel holder 15 and the backlight case 16 at their non-effective effective illuminated regions 12b on the outside of effective illuminated regions 12a in which the image display region 10a of the LCD panel 10 is illuminated.

Next, the positioning structure of the optical sheets will be described. Among the four sides of the optical sheets 12, one side in a vertical direction and one side in a horizontal direction are support sides 12c held by the inside walls of the panel holder 15. In addition, sides opposite to the support sides 12c among those in the vertical and horizontal directions are non-contact sides 12d creating the gaps between the non-contact sides 12d and the inside walls of the panel holder 15. Moreover, the optical sheets 12 have hole portions 12e parallel to the support sides 12c in the non-effective effective illuminated region 12b near the two support sides 12c, i.e., in a region corresponding to the periphery on the outside of the image display region of the LCD panel 10. The hole portions 12e are cuboid-shaped through-holes having inside walls parallel to the support sides 12c of the optical sheets 12. Furthermore, the backlight case 16 has convex shapes 16a curving and rising from the installation surface of the optical sheets 12 to the side of the LCD panel 10, and the convex shapes 16a are in contact with sides on the support sides 12c of the hole portions 12e.

Figure 3:
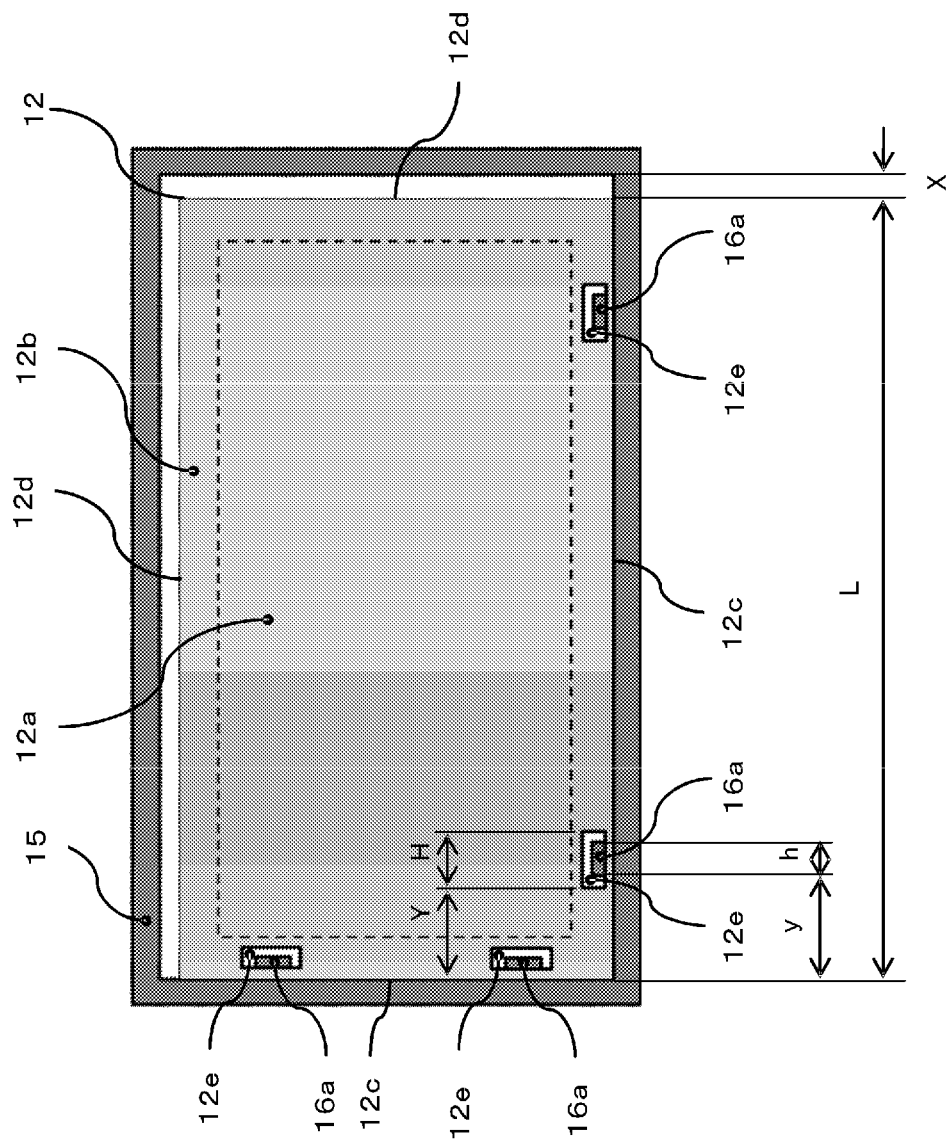
FIG. 3 is a schematic view showing the holding structure of optical sheets according to the first embodiment.

Next, the sizes of the respective portions and the effects of the first embodiment will be described using FIG. 3. FIG. 3 is a schematic view showing the holding structure of the optical sheets according to the present invention.

Temperature of the optical sheets 12 changes with the heat generation or environmental temperature of the display module 1. At this time, the optical sheets 12 expand and retract in their entireties such that the two non-contact sides 12d deform in parallel with the support sides 12c, but the non-contact sides 12d have a size at which they are not in contact with the panel holder 15. That is, gaps X between the non-contact sides 12d and the panel holder 15 at base temperature (for example, at general temperature, i.e., normal temperature assumed as the use environment of a panel module) are set so as to satisfy the following relationship.

$$X \geq L \times \alpha \times \Delta t1 \quad \text{(formula 1)}$$

Here, the length of the optical sheets is expressed as L, the thermal expansion coefficient of the optical sheets is expressed as α, and a prescribed temperature increasing amount (for example, a maximum temperature increasing amount) from the base temperature is expressed as Δt1.

Similarly, the hole portions 12e of the optical sheet 12 change their positions in parallel with the support sides 12c when the optical sheets 12 expand and retract in their entireties. However, the sizes of the position and the length of the hole portions 12e are set such that the hole portions 12e are not in contact with the convex shapes 16a of the backlight case 16 at thermal deformation. That is, a distance Y between the support side 12c and the hole portion 12e and a length H of the hole portion 12e at the base temperature are set so as to satisfy the following relationships.

$$Y \leq y - (Y \times \alpha \times \Delta t1) \quad \text{(formula 2)}$$

$$H + Y \geq y + h + [(H+Y) \times \alpha \times \Delta t2] \quad \text{(formula 3)}$$

Here, the distance between the support side 12c and the convex shape 16a is expressed as y, the length of the convex shape 16a is expressed as h, and the thermal expansion coefficient of the optical sheet is expressed as α at the base temperature. In addition, a prescribed temperature increasing amount (for example, a maximum temperature increasing amount) from the base temperature is expressed as Δt1, and a prescribed temperature decreasing amount (for example, a maximum temperature decreasing amount) from the base temperature is expressed as Δt2.

Since the optical sheets 12 are positioned with the above configuration, rubbing of the sheets due to vibration may be prevented. In addition, as positioning shapes for the optical sheets 12, convex shapes, which restrict movement in directions perpendicular to the inside wall surfaces of the panel holder and allow deformation (deformation of the optical sheets 12 due to their expansion or retraction) in directions parallel to the support sides 12c, are provided near the two support sides 12c. Therefore, the sheets expand and retract in their entireties such that the non-contact sides 12d move parallelly at thermal deformation, and no large force is applied to the positioning shapes. Therefore, rattling or wrinkling of the optical sheets 12 may be restrained.

The convex shapes are provided on the backlight case in the first embodiment but may be provided on other components such as the panel holder. The convex shapes may be cylindrical shapes or shapes having arc surfaces being in contact with the hole portions. The hole portions and the convex shapes are only required to be provided at one or more places in the respective directions. The hole portions are required to be parallel to contact surfaces only at their surfaces being in contact with the convex shapes. The optical sheets may have gaps in their front and rear surface directions or may be held by elasticity members.

Figure 4:
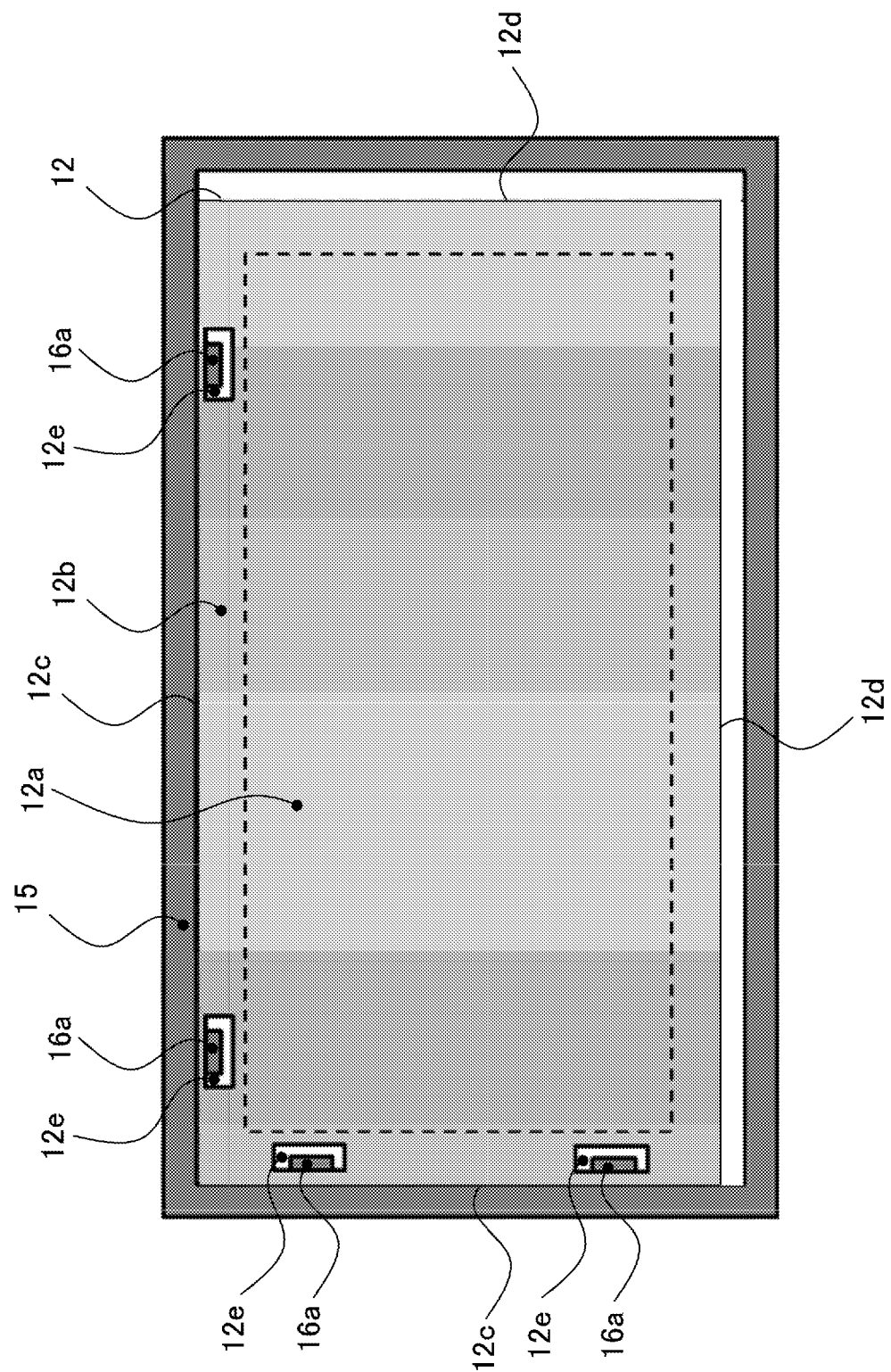
FIG. 4 is a schematic view showing the holding structure of the optical sheets according to the first embodiment.

The above first embodiment describes a case in which the sides serving as the support sides 12c held in contact with the inside walls of the panel holder 15 among the four sides of the optical sheets 12 are the left side in the vertical direction and the lower side in the horizontal direction. However, other sides may be the support sides 12c so long as one side in the vertical direction and one side in the horizontal direction among the four sides are the support sides 12c. As shown in, for example, FIG. 4, it may be possible to make the left side in the vertical direction and the upper side in the horizontal direction serve as the support sides 12c and set the positioning shapes at their upper portions. In this case, as shown in FIG. 4, the hole portions 12e are provided in the non-effective effective illuminated region 12b of the left and upper sides, and the convex shapes 16a are provided at the places of the backlight case 16 corresponding to the hole portions 12e of the left and upper sides. Even with this structure, the above effects of the first embodiment are obtained.

Figure 5:
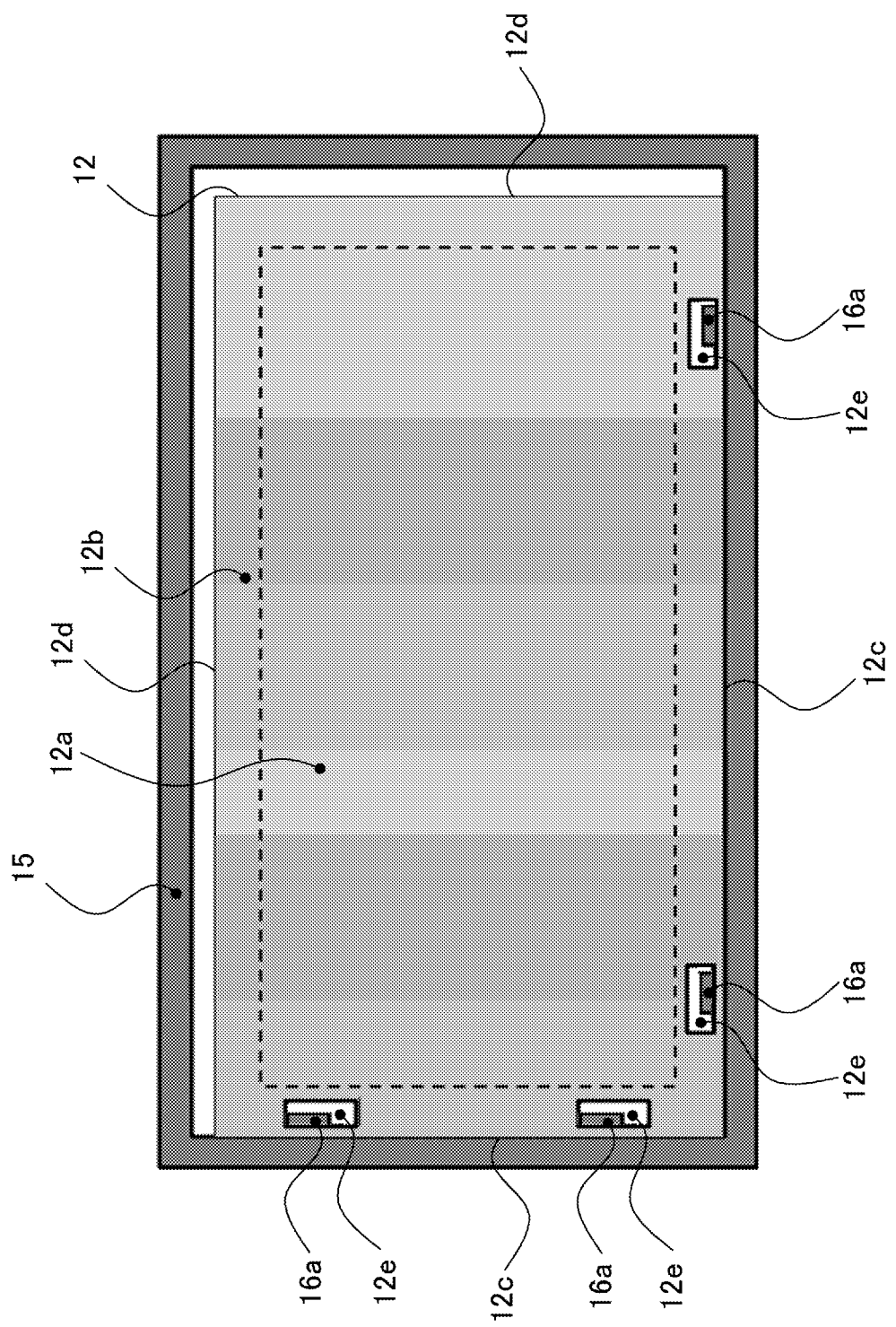
FIG. 5 is a schematic view showing the holding structure of the optical sheets according to the first embodiment.

The above first embodiment describes a case in which the central positions of the hole portions 12e and the convex shapes 16a align with each other at the base temperature. However, the central positions of the hole portions 12e and the convex shapes 16a may not align with each other as shown in, for example, FIG. 5 so long as the above formulae 1 to 3 are satisfied. Provided that the above formulae 1 to 3 are satisfied, the optical sheets 12 are restrained from being in contact with the convex shapes 16a even when the optical sheets 12 retract or expand. Therefore, deformation such as contraction and expansion of the optical sheet 12 is not limited, and thus rattling or wrinkling of the optical sheets 12 may be restrained.

Figure 6A:
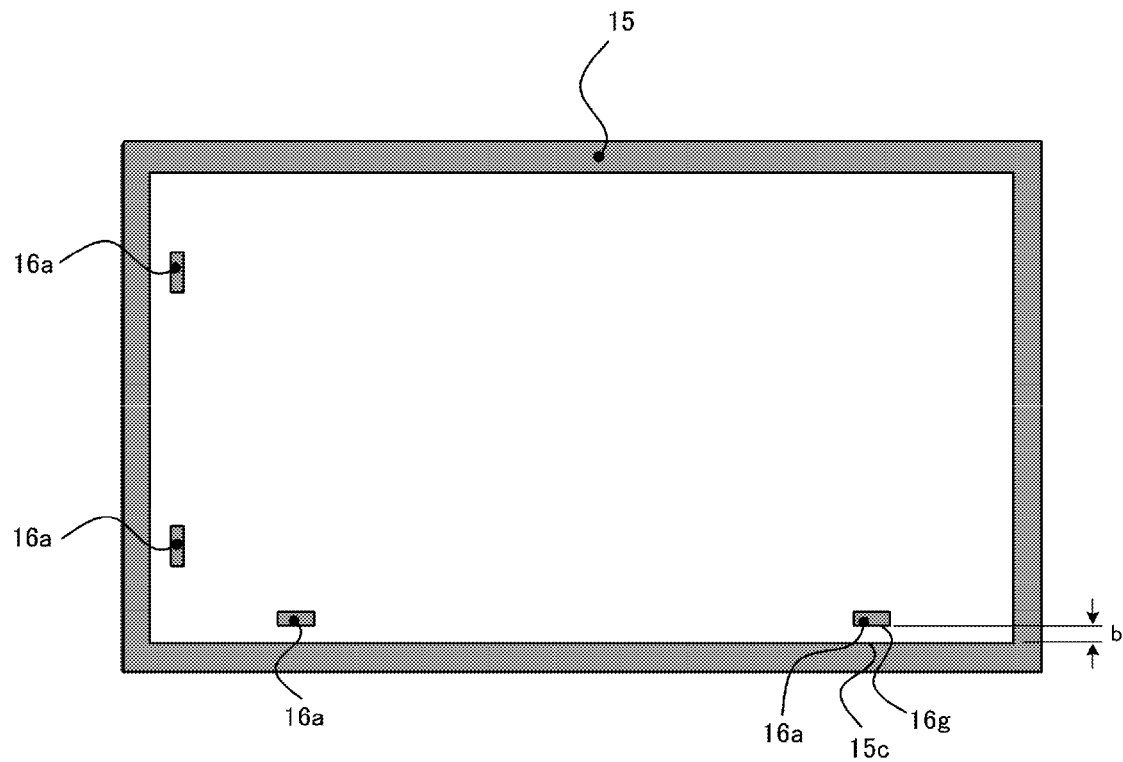
FIGS. 6A and 6B are schematic views showing the holding structure of the optical sheets according to the first embodiment.
Figure 6B:
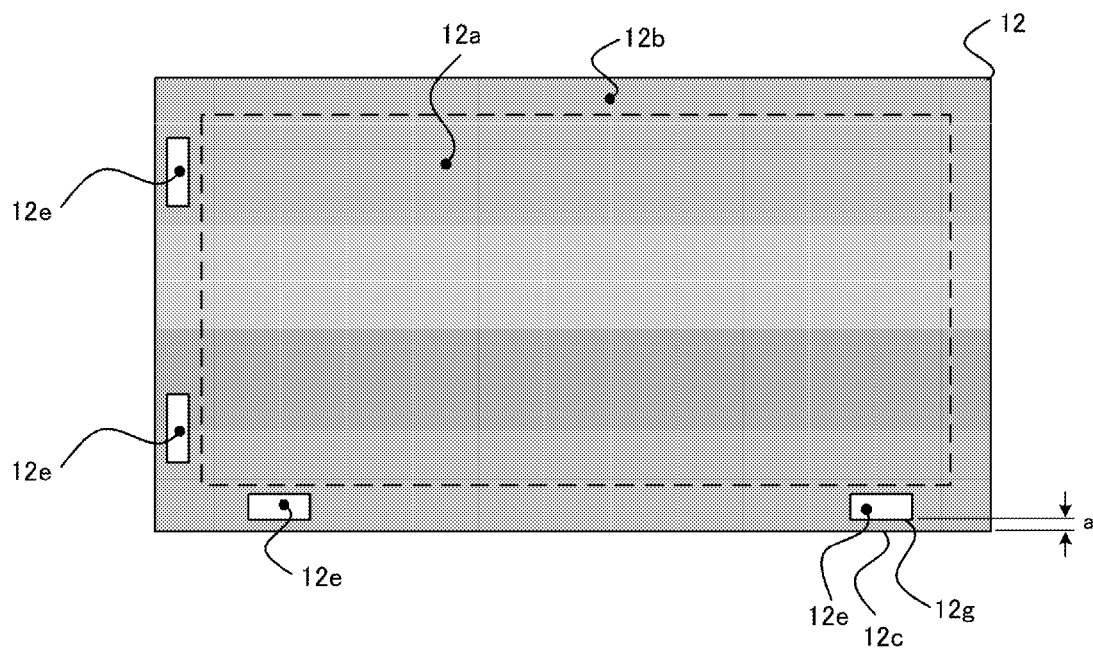

FIG. 6A is a view showing only the panel holder 15 and the convex shapes 16a of the backlight case 16, and FIG. 6B is a view showing only the optical sheet 12. In FIG. 6A, the distance in a perpendicular direction between a lower surface 16g of the convex shape 16a and a surface 15c of the panel holder 15 that is in contact with the optical sheet 12 is expressed as b. In FIG. 6B, the distance in a direction perpendicular to the inside wall surface of the panel holder 15 between a lower surface 12g of the hole portion 12e of the optical sheet 12 not attached to the backlight case 16 and the support side 12c being in contact with the panel holder 15 is expressed as a. Here, it is preferable to satisfy the following formula.

$$a \leq b \quad \text{(formula 4)}$$

Thus, restriction on the deformation of the optical sheets is restrained, and reduction in image quality due to the occurrence of wrinkling is restrained.

Figure 7:
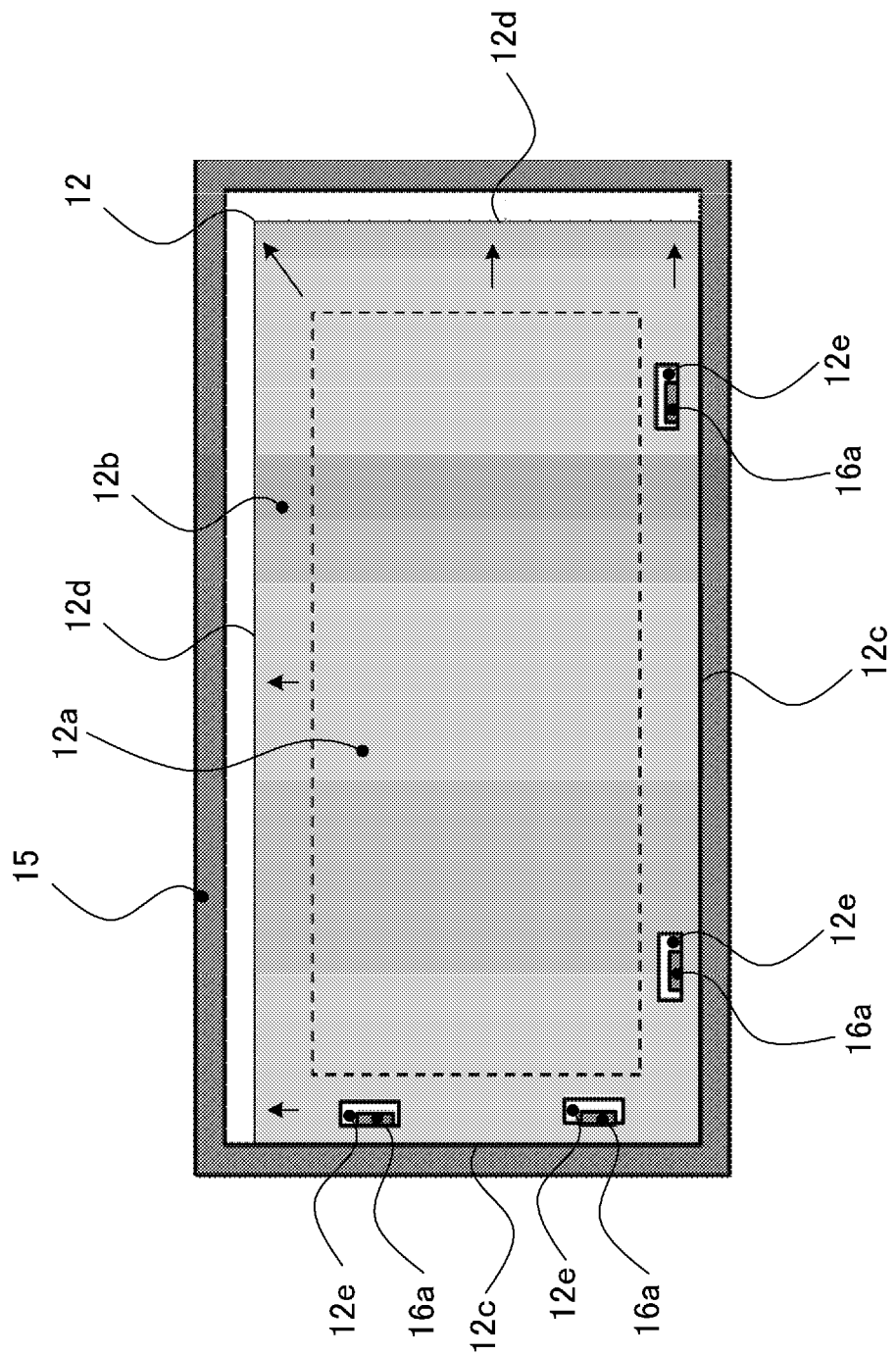
FIG. 7 is a schematic view showing the holding structure of the optical sheets according to the first embodiment.

FIG. 7 is a view schematically showing a state in which the optical sheets 12 installed as in FIG. 3 thermally expand at the base temperature. As shown in FIG. 7, the optical sheets 12 are allowed to expand toward the right and upper sides of the figure. Since the sizes of the convex shapes 16a and the hole portions 12e are set in the way described above, as shown in FIG. 7 the deformation of the optical sheets 12 toward the right and upper sides is not restricted even when the optical sheets 12 expand. Therefore, the occurrence of the wrinkling of the optical sheets is restrained. FIG. 7 shows the positional relationship between the hole portions 12e and the convex shapes 16a in which the hole portions 12e on the left side are relatively on the upper side of the convex shapes 16a and the hole portions 12e on the lower side are relatively on the right side of the convex shapes 16a when the optical sheets deform due to its expansion.

Second Embodiment

Hereinafter, a description will be given of a second embodiment of the present invention with reference to the drawings.

Figure 8:
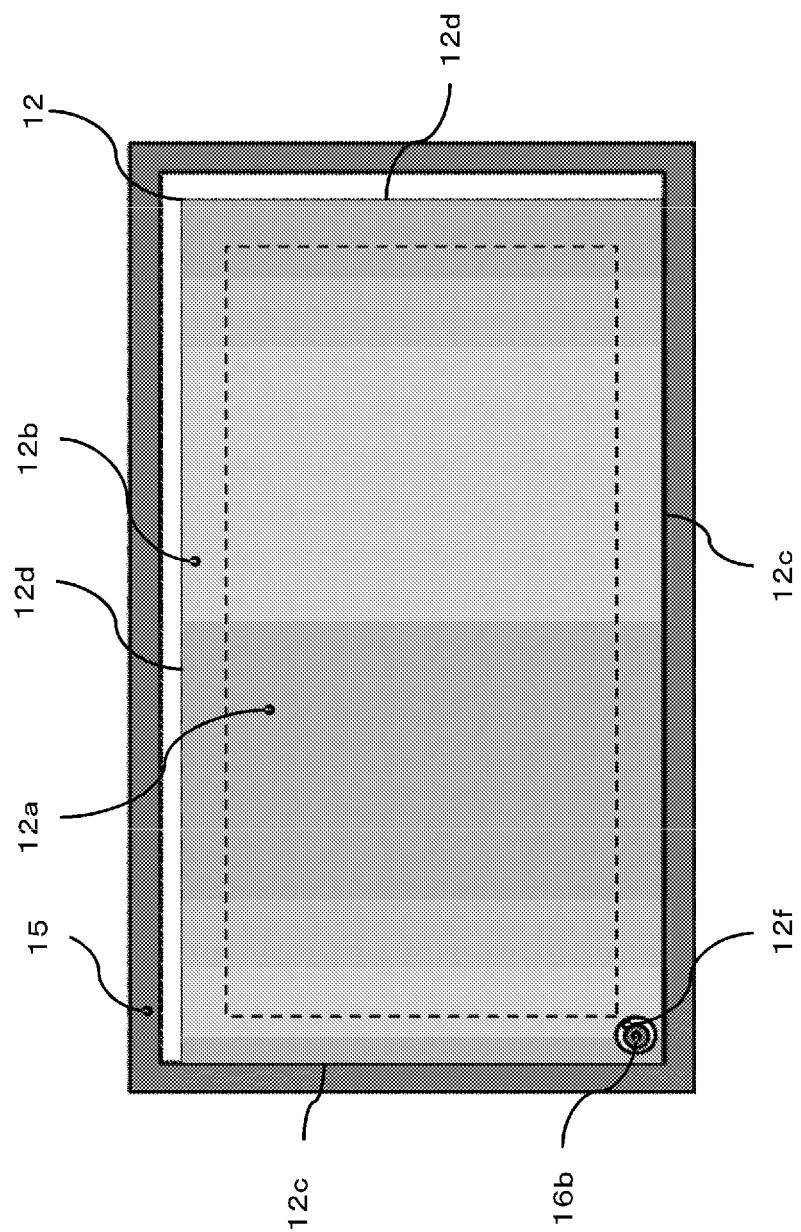
FIG. 8 is a schematic view showing the holding structure of the optical sheets according to a second embodiment.

FIG. 8 is a schematic view showing the holding structure of the optical sheets according to the second embodiment.

Since the second embodiment is the same as the first embodiment in its schematic configuration, only the differences between the first and second embodiments will be described. Among the four sides of the optical sheets 12, one side in the vertical direction and one side in the horizontal direction are the support sides 12c held in contact with the inside walls of the panel holder 15. In addition, among the sides in the vertical and horizontal directions, sides opposite to the support sides 12c are the non-contact sides 12d creating the gaps between the non-contact sides 12c and the inside walls of the panel holder 15. That is, among the four sides, the two sides are the support sides 12c, and the two other sides are the non-contact sides 12d. Moreover, the optical sheets 12 have a cylindrically-shaped hole portion 12f perpendicular to the display surface in the non-effective effective illuminated region 12b at the corner of the intersection between the two sides serving as the support sides 12c. Furthermore, the backlight case 16 has a cylindrical shape 16b having substantially the same diameter as that of the hole portion 12f from the installation surface of the optical sheets 12 to the side of the LCD panel 10, and the cylindrical shape 16b engages with the hole portion 12f.

With the above configuration, the same effects as those of the first embodiment may be obtained by the structure different from that of the first embodiment.

The above first embodiment describes a case in which the hole portions 12e have a cuboid shape, i.e., they have a rectangular cross section in their surfaces parallel to space. In addition, the above second embodiment describes a case in which the hole portion 12f has a cylindrical shape, i.e., it has a circular cross section in its surface parallel to space. However, the hole portions 12e and the hole portion 12f may have other shapes. For example, the hole portions 12e and the hole portion 12f may have the cross sections of various shapes such as a square shape, a trapezoidal shape, and a circular shape in their surfaces parallel to the space.

Third Embodiment

Hereinafter, a description will be given of a third embodiment of the present invention with reference to the drawings.

Figure 9:
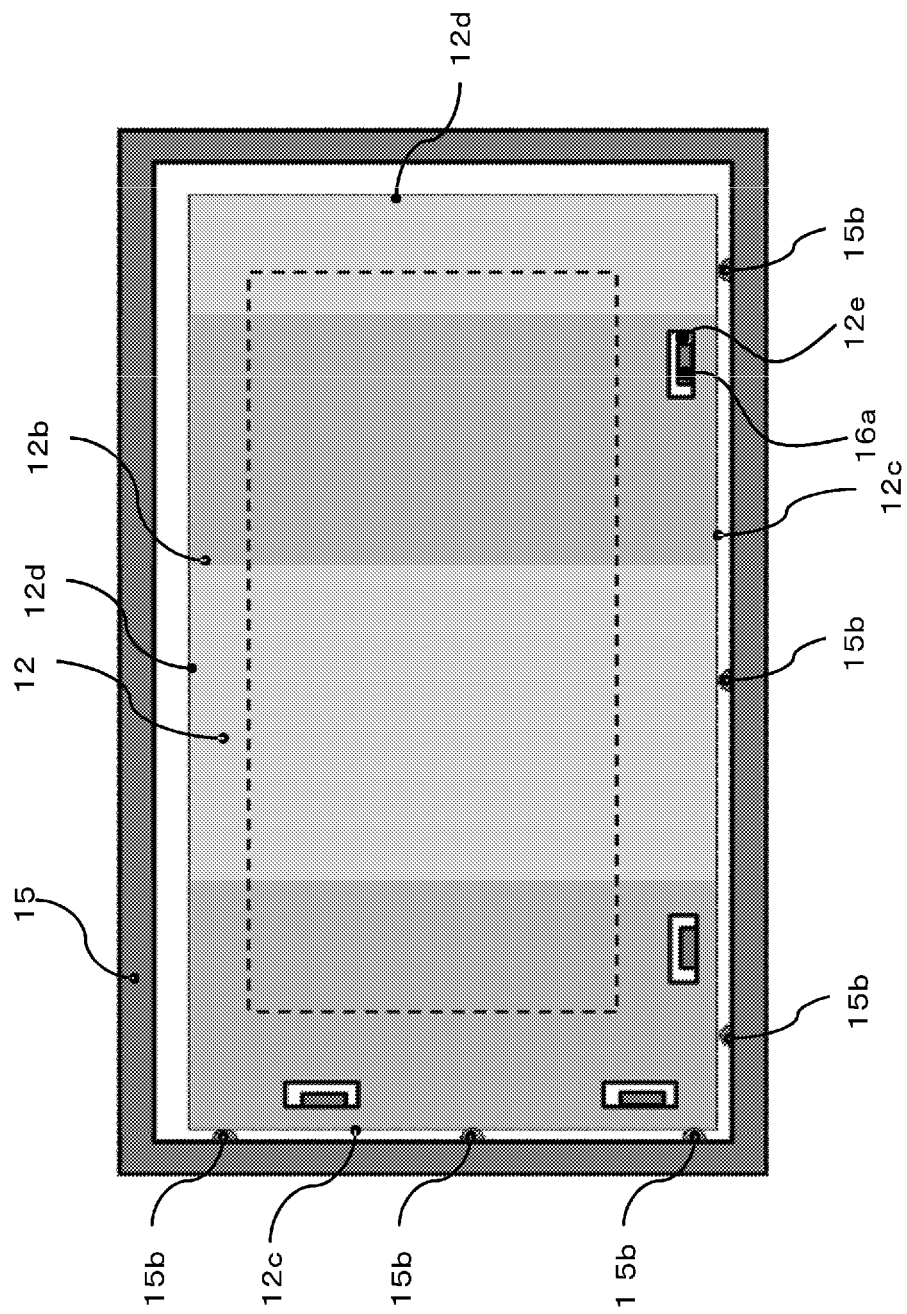
FIG. 9 is a schematic view showing the holding structure of the optical sheets according to a third embodiment.
Figure 10:
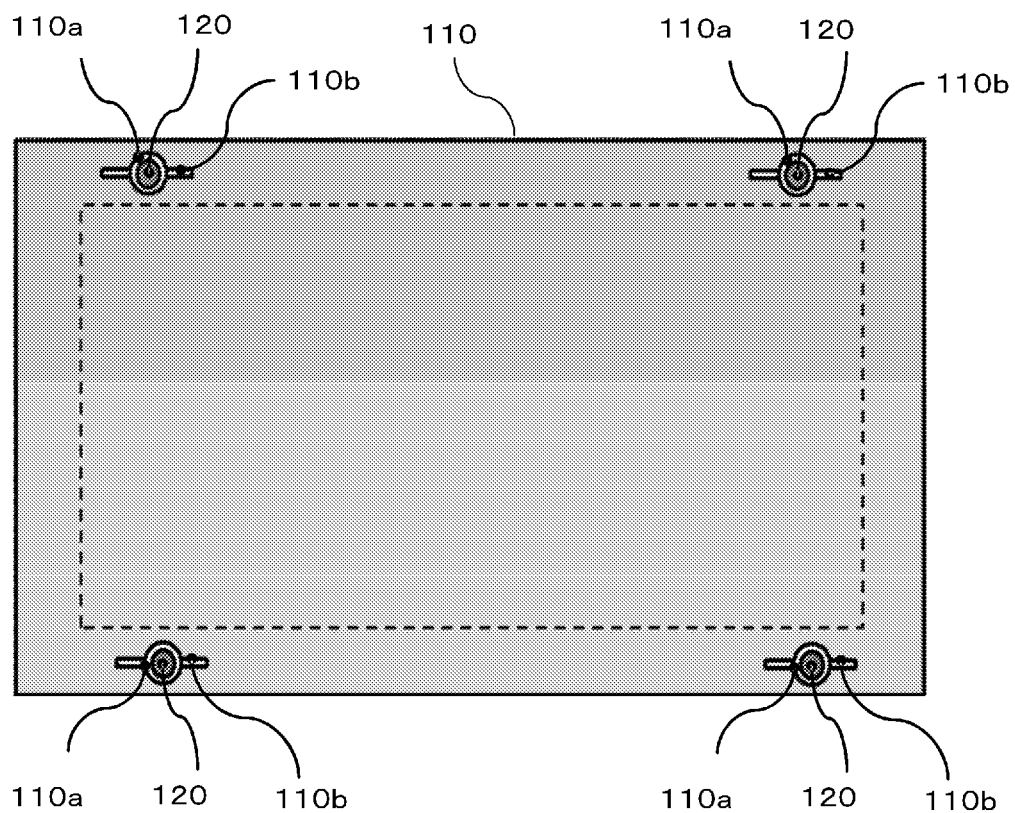
FIG. 10 is a schematic view showing the holding structure of optical sheets according to the related art.

FIG. 9 is a schematic view showing the holding structure of the optical sheets according to the third embodiment.

Since the third embodiment is the same as the first embodiment in its schematic configuration, only the elements different from those in the first embodiment will be mainly described. Among the four sides of the optical sheets 12, one side in the vertical direction and one side in the horizontal direction are the two support sides 12c held in contact with the inside walls of the panel holder 15, and sides opposite to the support sides 12c are the two non-contact sides 12d creating the gaps between the non-contact sides 12d and the inside walls of the panel holder 15. In addition, the optical sheets 12 have the hole portions 12e parallel to the support sides 12c in the non-effective effective illuminated region 12b near the two support sides 12c. Moreover, the backlight case 16 has the convex shapes 16a curving and rising from the surface on which the optical sheets 12 is installed toward the side of the LCD panel 10, and the optical sheets 12 is in contact with the hole portions 12e on the sides of the support sides 12c. Furthermore, the inside walls of the panel holder 15 being in contact with the support sides 12c of the optical sheets 12 has arc-shaped convex shapes 15b.

With the above configuration, the same effects as those of the first embodiment may be obtained. In addition, since the support sides 12c of the optical sheets 12 are in contact with the arc-shaped convex shapes 15b of the inside walls of the panel holder 15, the frictional resistance between the optical sheets 12 and the panel holder 15 reduces. That is, the frictional resistance between the support sides 12c and the convex shapes 15b is smaller than that between the support sides 12c and the inside wall surfaces of the panel holder 15. Thus, the thermal deformation of the optical sheets 12 due to the frictional heat between the optical sheets 12 and the panel holder 15 is restrained. As a result, the occurrence of the wrinkling of the optical sheets 12 may be restrained.

The above third embodiment describes an example in which the inside walls of the panel holder 15 have the convex shapes 15b as members to realize reduction in friction. However, the convex shapes may be provided separately from the panel holder 15 or may be provided on the optical sheets 12. Members provided on the inside walls of the panel holder 15 may have any shape other than the convex shapes 15b of FIG. 9 so long as they reduce the frictional resistance between the optical sheets 12 and the panel holder 15. For example, at least some of the contact portion between the panel holder 15 and the optical sheet 12 are polished or ground to have finer surface roughness than other portions. In this way, the polished portion may serve as a friction reduction portion. In addition, members having fine surface roughness and capable of reducing friction may be provided on the panel holder 15 instead of the convex shapes 15b. Moreover, instead of the convex shapes 15b, sliding members allowing the panel holder 15 to slide with respect to the contact surfaces of the optical sheets 12 may be provided or rotation members such as rollers may be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-234529, filed on Nov. 19, 2014, and Japanese Patent Application No. 2015-214684, filed on Oct. 30, 2015, which are hereby incorporated by reference herein in their entirety.

What is claimed is:

1. A display apparatus comprising:
   a display panel;
   a light source unit configured to illuminate the display panel from a back surface side thereof;
   an optical sheet arranged between the display panel and the light source unit; and
   a housing configured to accommodate the light source unit and the optical sheet, wherein
   one or more hole portions are provided on an area of the optical sheet along a support side, which is one side among four sides of the optical sheet, while no hole portion is provided on an area of the optical sheet along an opposite side that is opposite the support side of the optical sheet,
   a gap is provided between the housing and the opposite side so that the opposite side does not contact the housing, and
   the housing has a positioning portion that engages with each of the hole portions and restricts movement of the optical sheet in directions perpendicular to the support side.

2. The display apparatus according to claim 1, wherein the optical sheet is held with the support side.

3. The display apparatus according to claim 1, wherein the hole portions have a cuboid shape having inside walls parallel to the inside walls of the housing.

4. The display apparatus according to claim 3, wherein the positioning portion is a convex-shaped member provided on the housing, and
   the convex-shaped members are in contact with, among inside walls of the hole portions parallel to the inside walls of the housing, the inside walls on sides closer to the inside walls of the housing.

5. The display apparatus according to claim 4, wherein a size of gaps between inside walls of the hole portions perpendicular to the inside walls of the housing and the convex-shaped members is set such that the inside walls of the hole portions are not in contact with the convex-shaped members when temperature increases or decreases from base temperature by a prescribed amount.

6. The display apparatus according to claim 4, wherein the convex-shaped members are cylindrically-shaped members or members having arc surfaces being in contact with the inside walls of the hole portions parallel to the inside walls of the housing.

7. The display apparatus according to claim 1, wherein the hole portions are provided at a periphery on an outside of an image display region of the display panel in the optical sheet.

8. The display apparatus according to claim 1, wherein a size of the gap between the opposite side of the optical sheet and an inside wall of the housing is set such that the opposite side of the optical sheet does not contact the inside wall of the housing when temperature increases or decreases from base temperature by a prescribed amount.

9. The display apparatus according to claim 1, wherein the optical sheet is held with the support side being in contact with holding portions provided on an inside wall of the housing.

10. The display apparatus according to claim 9, wherein frictional resistance between the support side of the optical sheet and the holding portions is smaller than frictional resistance between the support side of the optical sheet and the inside wall of the housing.

11. The display apparatus according to claim 9, wherein the holding portions are arc-shaped convex portions.

12. The display apparatus according to claim 1, wherein the optical sheet is held with holding portions on the support side being in contact with an inside wall of the housing.

13. The display apparatus according to claim 12, wherein frictional resistance between the holding portions and the inside wall of the housing is smaller than frictional resistance between the support side of the optical sheet and the inside wall of the housing.

14. The display apparatus according to claim 12, wherein the holding portions are arc-shaped convex portions.

15. The display apparatus according to claim 1, wherein
the optical sheet is held with the support side being in contact with an inside Uwall of the housing, and
the support side of the optical sheet and the inside wall of the housing have finer surface roughness at contact portions thereof than other portions.

16. The display apparatus according to claim 1, wherein
the support side of the optical sheet is held by a sliding member or a rotating member provided between the optical sheet and an inside wall of the housing.

17. The display apparatus according to claim 1, wherein the optical sheet deforms due to expansion or contraction.

18. A display apparatus comprising:
a display panel;
a light source unit configured to illuminate the display panel from a back surface side thereof;
an optical sheet arranged between the display panel and the light source unit; and
a housing configured to accommodate the light source unit and the optical sheet, wherein
a hole portion is provided in the optical sheet near a point at an intersection of a first support side of the optical sheet, which is one side among four sides of the optical sheet, and a second support side of the optical sheet, which is one side among the four sides of the optical sheet and is perpendicular to the first support side, while no hole portion is provided in the optical sheet near a point at an intersection of a third side of the optical sheet, which is opposite the first support side, and a fourth side of the optical sheet, which is opposite the second support side,
a gap is provided between the housing and the third side of the optical sheet and between the housing and the fourth side of the optical sheet, so that the third side and the fourth side do not contact the housing, and
the housing has a positioning portion that engages with the hole portion and restricts movement of the optical sheet.

19. The display apparatus according to claim 18, wherein the optical sheet is held with the first and second support sides being in contact with the inside walls of the housing.

20. The display apparatus according to claim 18, wherein
the positioning portion is a convex-shaped member provided on the housing, and
the hole portion has a cylindrical shape in a direction perpendicular to a display surface of the display panel.

\* \* \* \* \*